Aug. 5, 1952    H. V. WESTER ET AL    2,605,587
LIQUID APPLICATOR
Filed Nov. 29, 1948    2 SHEETS—SHEET 1
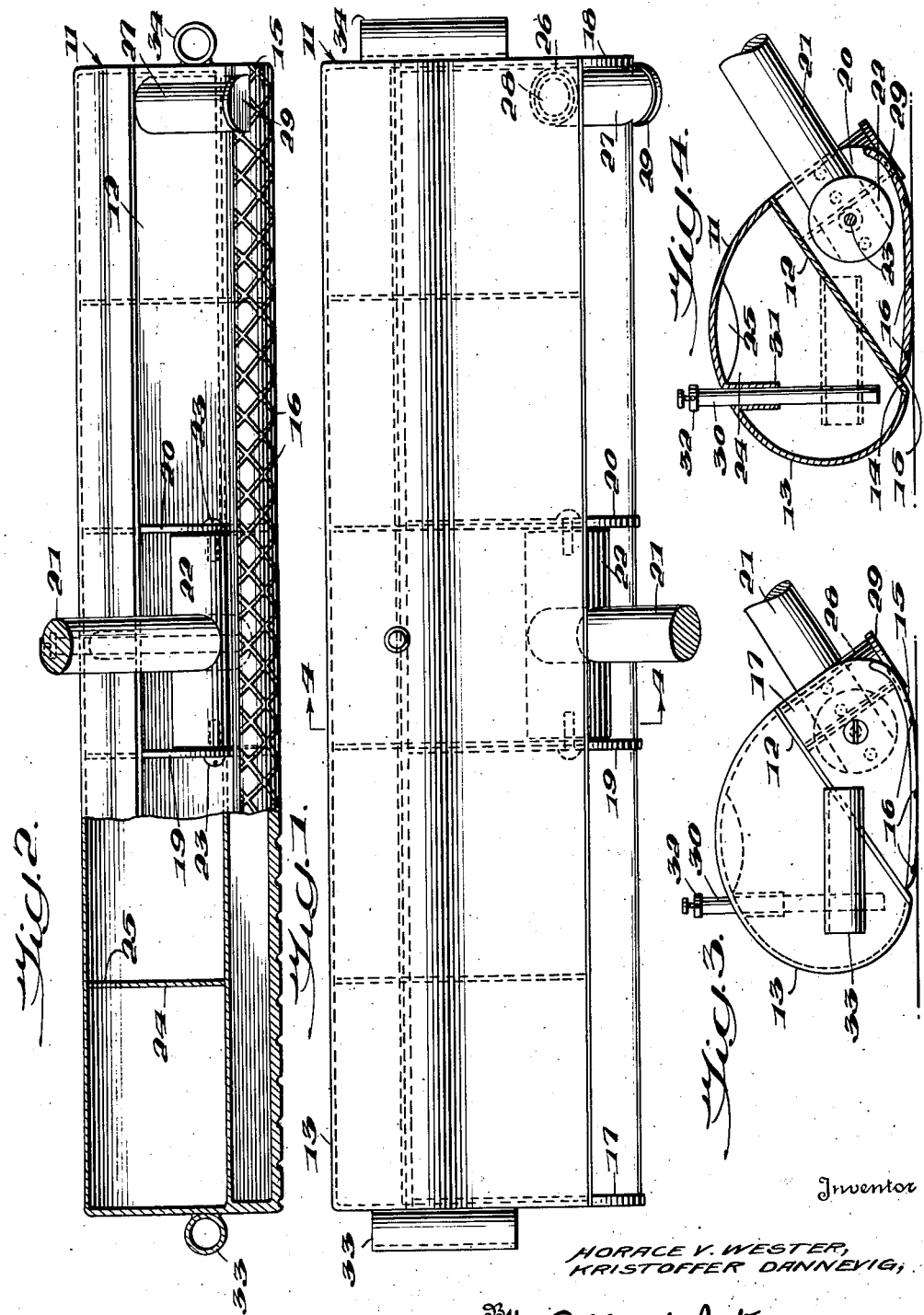
Inventor
HORACE V. WESTER,
KRISTOFFER DANNEVIG,
By Albert J. Kramer
Attorney

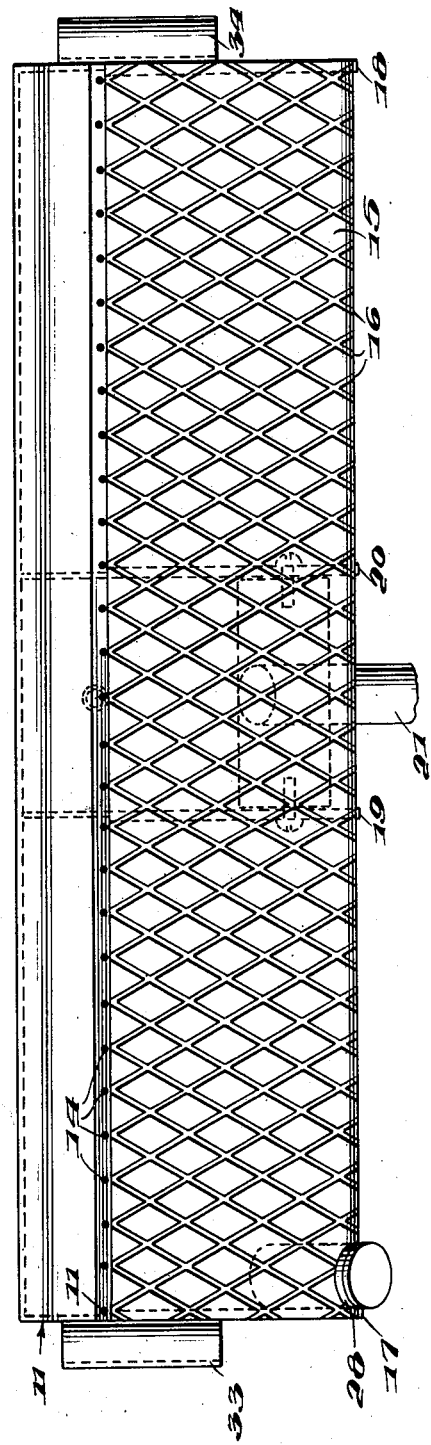
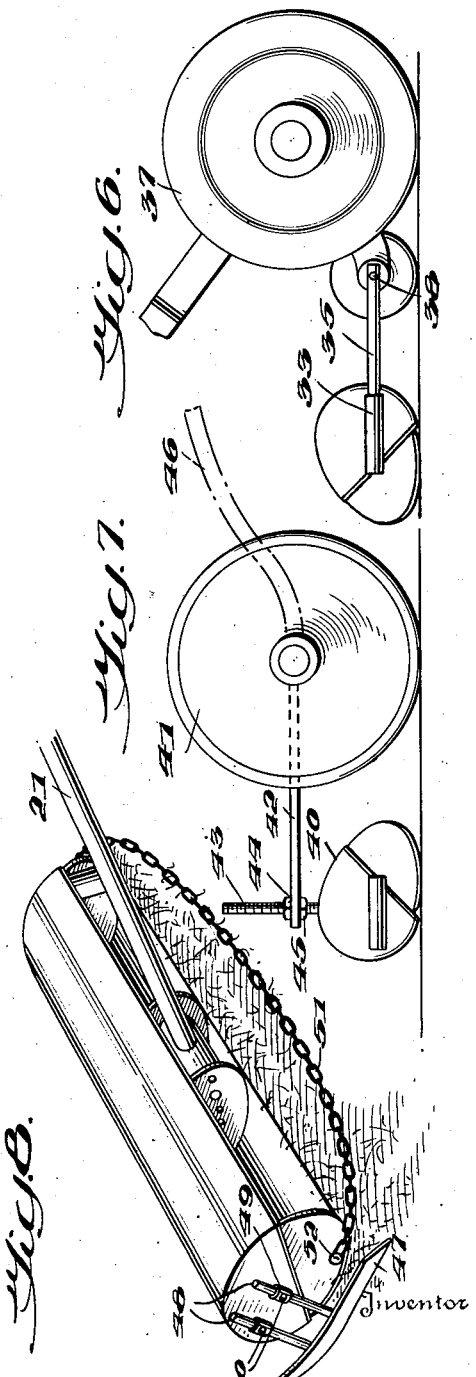

Patented Aug. 5, 1952

2,605,587

UNITED STATES PATENT OFFICE 2,605,587

LIQUID APPLICATOR

Horace V. Wester, Washington, D. C., and Kristoffer Dannevig, Everett, Wash.; said Dannevig assignor to said Wester Application November 29, 1948, Serial No. 62,446

18 Claims. (Cl. 47—1)

1

This invention relates to the application of liquid chemicals to soil and growing vegetation and more particularly to devices for making such applications.

An object of this invention is the provision of apparatus which functions to distribute the liquid evenly over the ground and on growing vegetation.

Another object of this invention is the provision of apparatus by means of which the flow of chemicals from the apparatus can be controlled.

A further object of this invention is to provide an apparatus of the type mentioned which may be used either alone or in combination with a vehicle moveable over the surface of the ground, such as a lawn mower or other garden implement.

Further objects and advantages of this invention will be apparent from the following description considered together with the accompanying drawing, in which:

Fig. 1 is a top plan view of the applicator attached to the lower end of a handle bar.

Fig. 2 is a rear elevational view of the applicator, partly in section.

Fig. 3 is a side elevational view of the applicator.

Fig. 4 is a section along the line 4—4 of Fig. 1.

Fig. 5 is a bottom plan view of the applicator.

Fig. 6 is a side elevational view showing the applicator attached to an ordinary lawn mower.

Fig. 7 is a side elevational view showing the applicator attached to a special type of vehicle.

Fig. 8 is an isometric view of the applicator showing several modifications thereof.

Referring with more particularity to the drawing in which like numerals designate like parts, the embodiment illustrated comprises an elongated tank 11 which is wide at the top and narrow at the bottom in the nature of a trough. The rear wall 12 of the tank may be flat angling downwardly toward the front and the front wall 13 may be curved from the point where it meets the lower end of the rear wall around to where it meets the upper end of the rear wall. This construction permits the device to slide with ease over obstructions on the ground and also permits the maintenance of a large head of liquid in the tank for any given quantity thereof.

At the bottom of the tank, preferably along the lower edge of the wall 12, there is disposed a row of small apertures 14 of capillary size through which liquid in the tank is discharged.

Beneath the wall 12 there is disposed a rigid glide plate 15 upon which the tank rests when in use. The front end of the plate is secured in position adjacent the rear of the row of apertures 14 so that liquid leaving said apertures will directly contact the plate. The bottom of the plate is provided with a series of criss-cross grooves 16 the forward end of each groove being directly behind one of the apertures 14 to receive liquid therefrom and distribute it along the bottom face of the plate in divergent directions. When the plate rests on the ground, the grooves form a channel with the surface through which the liquid is distributed. The number of grooves 16 may be increased to any amount desired and may be made very fine on the order of an ordinary file for capillary effect. Such grooves may be provided by sandblasting the bottom surface of the plate in different directions or by etching it in accordance with known procedures. Grooves of this kind provide an unusually uniform distribution of liquid. Also, such grooves are not as likely to become clogged with dirt and other foreign matter as grooves of larger size.

The grooves 16 also function to mildly abrade vegetative matter to which the chemical is being applied which is particularly advantageous in the application of weed killers, such as 2,4-D, and also to rub off dust particles and smooth down the surface hairs of plants to permit a better contact of the chemical on the surface of the plants being treated.

The plate 15 is supported in position by means of brackets 17 and 18 at either end and inner brackets 19 and 20 on either side of the center. Additional brackets may be used if desired. The inner brackets also serve as a means for attaching to the device a handle 21 for pushing the device along the ground. One end of the handle 21 is provided with a horizontal bar 22 that fits between the brackets 19 and 20 and is secured in this position by means of bolts 23 passing through the brackets and bar.

Within the tank there is provided one or more transverse partitions 24 to subdivide the tank into a plurality of compartments so that when the device is operating over uneven ground and on the side of hills, the liquid will not all gravitate to one end of the tank thus insuring the discharge of liquid from all the apertures 14 or a substantial number of them.

The top of the partitions 24 are provided with cut-out portions 25 so that the compartments are intercommunicable with each other for purposes hereinafter more fully explained.

A filling aperture 26 is provided through the wall 12 near its upper edge and it is connected to one end of a tube 27 that projects outward and terminates near the heel of the plate 15. The tube 27 is provided with a removable plug 28 having a flange 29 or other suitable means to permit manual withdrawal of the plug.

In filling the tank with liquid, the applicator is turned upside down, the plug 28 removed and the liquid poured into the tank through the tube 27. As the liquid enters the tank it distributes itself evenly to all the compartments because of the intercommunication provided by the cutout areas 25 which, in this position of the tank, are at the lowermost position. In this position of the tank, each compartment is maintained at atmospheric pressure by means of the apertures 14, thereby avoiding the building up of back pressure in any of the compartments while the tank is being filled.

Through the top of the tank there is provided a vertical vent tube 30 slidably mounted in a sleeve 31, the latter being integral with the tank wall. The top of the tube 30 is attached to an air valve 32 to control the flow of air from the atmosphere into the tube 30 and thereby provide a measure of control of the pressure within the tank as the liquid flows out through the apertures 14.

This pressure is equalized throughout the tank in view of the intercommunication between the partitioned compartments provided by the cutout areas 25.

The tube 30 is sufficiently long to permit its lower end to be disposed in any desired position between the bottom of the tank and the liquid level.

In normal operation, the bottom end of the tube 30 is below the liquid level. As the liquid level drops, pressure in the tank drops. When the difference in pressure between the atmosphere and the inside of the tank is greater than the head of liquid above the bottom of the tube 30, air will be drawn in through the tube to maintain equilibrium. Consequently, the resultant pressure in the tank represented by the head of liquid between the bottom of the tank and the bottom of the tube will be effective to discharge liquid from the tank. By varying the position of the tube with respect to the liquid level and the bottom of the tank, in conjunction with the air valve, a close control of liquid discharge through apertures 14 is maintained.

Suitable means may be provided for attaching the device to a vehicle, such as, for example, an ordinary lawn mower. A preferred means comprises horizontal tubular members 33 and 34 on either side of the tank to receive the ends of bars 35, the other ends of the bars being attached to the vehicle, such as the lawn mower 37 (see Fig. 6) with bolts 38 through apertures in the lawn mower usually provided by the manufacturer for the attachment of a canvas basin for catching cut grass thrown backward by the mower. However, other means may be provided for securing the bars to a vehicle. It is preferred, in this embodiment, that the bars be of a somewhat flexible material, such as rubber or rubber tubing to provide a degree of vertical movement of the tank relative to the vehicle. By these means, it is assured that the tank will rest solidly on the ground in those instances when the tank is at a somewhat different elevation than the vehicle to which it is attached.

In Fig. 7 there is illustrated the combination of an applicator 40 of the type described with a two wheeled vehicle 41. The forward end of the vehicle is provided with one or more horizontal beams 42 projecting forwardly. The forward end of each beam engages a vertical rod 43 which is held in different vertical positions by any suitable means, such as nuts 44 and 45 on a threaded portion of the rod. The applicator 40 is secured to the lower end of the rods. Hence, the applicator can be raised or lowered relative to the ground by adjusting the vertical position of the rods with the nuts 44 and 45. The vehicle may be attached directly to the forward end of another vehicle such as a tractor (not shown) and pushed along the ground thereby. However, it may also be provided with handle bars 46 similar to that of a hand plow to permit the operator to push it along the ground while walking. This form of the invention permits its use on growing vegetation that is substantially above the ground level, such as tomato plants, bean bushes, beet stalks, lettuce, various flowers and other plants. This is provided not only by the vertical adjustability of the applicator on the vehicle, but also by the fact that the elevation of the applicator relative to any growing plant being encountered as the vehicle moves along the ground can quickly be changed by moving the handle bars 46 up or down as may be required in any particular case. Consequently, different sizes of plants can be readily treated in a continuous movement of the vehicle.

In Fig. 8 the applicator is shown supported on vertically adjustable skids 47. The adjustment is provided by means of upright rods 48 slideably disposed in tubular brackets 49 having set screws 50 adapted to abut the rods and hold them in different fixed positions relative to the applicator. In this manner the applicator may be set at any desired distance above the ground. This is particularly important in cases where it is desired to treat tall plants growing together in an area with shorter plants that are not to be treated.

Another modification shown in Fig. 8 which is independent of other modifications illustrated comprises the use of a drag chain 51 at the rear of the applicator. The ends of the chain may be secured to the sides of the applicator in any suitable manner, such as by hooks 52. Such a drag chain has the effect of distributing the chemical better over the surface of the ground. It may be used either in conjunction with the plate 15 or as an independent method of distributing the chemical. It is particularly valuable in the distribution of insecticides and fungicides where a uniform application is important for proper control.

The various embodiments of the invention described above are suitable for use in the application of numerous chemical liquids to plants and soils, such as fertilizers, plant growth substances, weed killers, insecticides, fungicides and others.

We claim:

1. A liquid applicator comprising an elongated rigid hollow tank for holding a liquid, said tank having downwardly convergent sides and having apertures therethrough at the bottom and an independent rigid glide plate secured to the tank on the rearward side of said apertures.

2. A liquid applicator comprising an elongated rigid hollow tank for holding a liquid, said tank having downwardly convergent sides and having apertures therethrough at the bottom, an independent rigid glide plate secured to the tank on the rearward side of said apertures, a solid transverse partition within said tank for sub-dividing the tank into a plurality of compartments and means for intercommunicating said sections with each other above the liquid level of the tank.

3. A liquid applicator as defined by claim 1 in which the apertures are disposed in a row along the bottom of the tank.

4. A liquid applicator as defined by claim 1 in which the bottom of the plate has a convex curvature.

5. A liquid applicator as defined by claim 1 in which the bottom of the plate is provided with a plurality of grooves.

6. A liquid applicator as defined by claim 1 in which the bottom of the plate is provided with a plurality of grooves one end of each being directly behind an aperture.

7. A liquid applicator as defined by claim 1 in which the bottom surface of the glide plate is provided with a plurality of capillary grooves.

8. A liquid applicator as defined by claim 1 having a vent tube disposed through the top of the tank.

9. A liquid applicator as defined by claim 1 having a vent tube slidably disposed through the top of the tank.

10. A liquid applicator as defined by claim 1 having a vent tube disposed through the top of the tank and an air valve in said tube.

11. A liquid applicator as defined by claim 1 and means for attaching the applicator to a vehicle.

12. A liquid applicator as defined by claim 1 and yieldable means for attaching the applicator to a vehicle.

13. A liquid applicator as defined by claim 1 and adjustable means for attaching the applicator to a vehicle.

14. A liquid applicator as defined by claim 1, means for attaching the applicator to a vehicle and means for elevationally adjusting the applicator on the vehicle.

15. A liquid applicator as defined by claim 1, and means for supporting the applicator on skids.

16. A liquid applicator as defined by claim 1, skids for supporting the applicator on the ground and means for elevationally adjusting the applicator on the skids.

17. A liquid applicator as defined by claim 1 and a drag chain attached to the rear thereof.

18. A liquid applicator comprising an elongated tank for holding a liquid, said tank having downwardly convergent sides and having apertures therethrough at the bottom, and means for attaching a drag chain at the rear of the applicator.

HORACE V. WESTER.
KRISTOFFER DANNEVIG.

REFERENCES CITED

The following references are of record in the file of this patent:

UNITED STATES PATENTS

| Number | Name | Date |
|---|---|---|
| 315,387 | Couteau | Apr. 7, 1885 |
| 464,603 | Hampton et al. | Dec. 18, 1891 |
| 521,164 | House | June 12, 1894 |
| 564,707 | MacKenzie | July 28, 1896 |
| 848,472 | Lechner | Mar. 26, 1907 |
| 1,287,487 | Smith | Dec. 10, 1918 |
| 1,454,308 | Arndt | May 8, 1923 |
| 2,081,673 | Olson | May 25, 1937 |
| 2,314,394 | Guy | Mar. 23, 1943 |

FOREIGN PATENTS

| Number | Country | Date |
|---|---|---|
| 114,164 | Australia | Nov. 13, 1941 |